(12) United States Patent
Matsumoto et al.

(10) Patent No.: US 6,633,280 B1
(45) Date of Patent: Oct. 14, 2003

(54) TOUCH PANEL DEVICE

(75) Inventors: Kanya Matsumoto, Tokyo (JP); Jiro Nakazono, Yamagata (JP)

(73) Assignees: Pioneer Corporation, Tokyo (JP); Tohoku Pioneer Corporation, Yamagata (JP)

( * ) Notice: Subject to any disclaimer, the term of this patent is extended or adjusted under 35 U.S.C. 154(b) by 91 days.

(21) Appl. No.: 09/712,128

(22) Filed: Nov. 15, 2000

(30) Foreign Application Priority Data

Nov. 15, 1999 (JP) .......................................... 11-324096

(51) Int. Cl.$^7$ ................................................. G09G 5/00
(52) U.S. Cl. ....................... 345/173; 345/179; 345/177; 178/19.02; 178/18.02; 178/18.04
(58) Field of Search ................................ 345/156, 157, 345/158, 159, 160, 169, 173, 177; 178/19.01, 19.03, 18.01–18.07, 19.06, 19.02, 19.04, 19.05, 20.01

(56) References Cited

U.S. PATENT DOCUMENTS 4,814,552 A * 3/1989 Stefik et al. .................. 178/18
5,637,839 A * 6/1997 Yamaguchi et al. .......... 178/19
6,064,374 A * 5/2000 Fukuzaki ..................... 345/179
6,421,235 B2 * 7/2002 Ditzik ......................... 361/683

* cited by examiner

Primary Examiner—Vijay Shankar
Assistant Examiner—Mansour M. Said
(74) Attorney, Agent, or Firm—Sughrue Mion, PLLC

(57) ABSTRACT

There are provided microphones 11A, 11B arranged at least any two different locations of edge portions of a touch panel 10, for sensing a ultrasonic signal propagated through a space, an input pen 12 containing a piezoelectric loudspeaker 12G, for oscillating a ultrasonic wave that is output from the piezoelectric loudspeaker 12G, and a touch position sensor 13 for calculating a coordinate of a touch position P by calculating distances between the microphones 11A, 11B and the touch position P of the input pen 12 on the touch panel 10 based on the ultrasonic wave sensed by the microphones 11A, 11B, whereby the microphones 11A, 11B have a sound collecting directivity characteristic in response to fitted positions of the edge portions of the touch panel 10.

11 Claims, 17 Drawing Sheets

3.4mm

10° (≒ 0.094mm)

FIG. 19 (0° CHARACTERISTIC)

(90° CHARACTERISTIC)

TOUCH PANEL DEVICE

BACKGROUND OF THE INVENTION

1. Field of the Invention

The present invention relates to a touch panel device in which information are input by an input pen onto a touch panel that is provided in front of a flat display such as a plasma display panel, etc.

2. Description of the Related Art

In recent years, the touch panel device has been spread as the inputting means for various information processing devices.

This touch panel device senses a coordinate of a touch position on the touch panel, and inputs various information into the information processing device in response to the touch position. Various systems have been proposed.

Out of the touch panel devices, there is the ultrasonic surface acoustic wave system that senses the coordinate of the touch position on the touch panel by utilizing the ultrasonic wave.

FIG. 25 is a schematic view showing the touch panel device in the conventional art utilizing the ultrasonic surface acoustic wave system.

In FIG. 25, the touch panel device comprises an X-side reflection array 2A on the transmitter side, which is provided horizontally to a lower edge portion of a touch panel 1; an X-side transmitter 2B arranged on the lower right-hand corner of the touch panel 1 and connected to the X-side reflection array 2A; an X-side reflection array 3A on the receiver side, which is provided horizontally to an upper edge portion of the touch panel 1 so as to oppose to the X-side reflection array 2A; an X-side receiver 3B arranged on the upper right-hand corner of the touch panel 1 and connected to the X-side reflection array 3A; a Y-side reflection array 4A on the transmitter side, which is provided vertically to a left-side edge portion of the touch panel 1; a Y-side transmitter 4B arranged on the upper left-hand corner of the touch panel 1 and connected to the Y-side reflection array 4A; a Y-side reflection array 5A on the receiver side, which is provided vertically to a right-side edge portion of the touch panel 1 so as to oppose to the Y-side reflection array 4A; and a Y-side receiver 5B arranged on the upper right-hand corner of the touch panel 1 and connected to the Y-side reflection array 5A.

In this touch panel device, the ultrasonic wave that is output from the X-side transmitter 2B is oscillated upward in the vertical direction from respective positions, which are provided along the axis direction (X direction) of the X-side reflection array 2A on the transmitter side, to the X-side reflection array 3A on the receiver side. Then, the ultrasonic wave that is received at respective positions, which are provided along the axis direction (X direction) of the X-side reflection array 3A on the receiver side, is input into the X-side receiver 3B.

Also, the ultrasonic wave that is output from the Y-side transmitter 4B is oscillated rightward in the horizontal direction from respective positions, which are provided along the axis direction (Y direction) of the Y-side reflection array 4A on the transmitter side, to the Y-side reflection array 5A on the receiver side. Then, the ultrasonic wave that is received at respective positions, which are provided along the axis direction (Y direction) of the Y-side reflection array 5A on the receiver side, is input into the X-side receiver 5B.

Then, identification of the touch position on the touch panel 1 is carried out as follows. For example, when any position P' on the touch panel 1 is touched as shown, the ultrasonic waves that are oscillated respectively from the X-side reflection array 2A and the Y-side reflection array 4A on the transmitter side are blocked by the finger, the input pen, or the like, that touches the touch panel 1. Therefore, the positions (x coordinate and y coordinate) on the X-side reflection array 3A and the Y-side reflection array 5A on the receiver side can be detected based on change (attenuation) of the ultrasonic signals that are input into the X-side receiver 3B and the X-side receiver 5B.

This ultrasonic surface acoustic wave system touch panel device has the characteristic such that it is less affected by the temperature and the humidity and is excellent in the durability.

However, the ultrasonic surface acoustic wave system touch panel device in the conventional art has problems such that, as shown in FIG. 25, the transmitter-side reflection array and the receiver-side reflection array must be arranged on four sides of the touch panel respectively and in addition, in order to reduce the detection error by increasing the detection precision of the touch position, the size of the device is increased and the detection precision has a limit since acoustic transmitter portions and receiver portions must set finely in the transmitter-side reflection array and the receiver-side reflection array respectively.

Also, the ultrasonic surface acoustic wave system touch panel device in the conventional art identifies the touch position P' by sensing the vibration caused by the acoustic wave and propagated over the touch panel 1. Therefore, if this touch panel device is fitted to the plasma display panel (PDP), for example, there is such a possibility that the vibration generated in the touch panel 1 by driving the PDP is sensed as the noise and thus the error is caused in the detection result.

SUMMARY OF THE INVENTION

The present invention has been made to overcome the problem that is included in the above touch panel device in the conventional art.

That is, it is an object of the present invention to provide a touch panel device capable of sensing a touch position by a simple configuration with high precision.

In order to achieve the above object, according to the first invention, there is provided a touch panel device for sensing a touch position on a touch panel provided in front of the flat display device, comprising sound collecting members arranged at least any two different locations of edge portions of the touch panel, for sensing a sound signal propagated through a space; an input pen containing a signal oscillating member, for oscillating an oscillated signal that is output from the signal oscillating member from a top end portion; and a coordinate position calculating member for calculating a coordinate of the touch position of the input pen on the touch panel by calculating distances between the sound collecting members and the touch position of the input pen on the touch panel, based on the sound signal oscillated from the input pen to be sensed by the sound collecting members; wherein the sound collecting members have a sound collecting directivity characteristic that can cover an overall surface of the touch panel in response to fitted positions of the edge portions of the touch panel.

According to the touch panel device of the first invention, when the top end portion of the input pen touches the touch panel, the sound signal such as the acoustic wave output from the signal oscillating member built in the input pen is oscillated from the top end portion of the input pen to propagate through the space along the front surface of the touch panel, and then is sensed by the sound collecting members, that are fitted to at least two different locations of the edges portions of the touch panel, respectively.

Then, the coordinate position calculating member calculates the distances between the sound collecting members and the touch position on the touch panel, at which the sound signal is oscillated, based on the sound signal sensed by the sound collecting members and then calculates the X, Y coordinate values on the touch position of the touch panel based on respective calculated distances to identify the touch position of the input pen.

Then, the sound collecting members that sense the sound signal oscillated from the input pen to identify the touch position have the sound collecting directivity characteristic to cover the overall surface of the touch panel, for example, 90 degree if the sound collecting members are arranged at the corner positions of the edge portions of the touch panel or 180 degree if the sound collecting members are arranged in the middle positions of the edge portions of the touch panel. Therefore, even if the input pen touches any position on the touch panel, the sound signal oscillated from the input pen can be sensed by the sound collecting members.

As described above, according to the touch panel device of the first invention, the touch position on the touch panel can be identified only by arranging the sound collecting members at two locations of the edge portions of the touch panel. In addition, since the sound collecting members have the sound collecting directivity characteristic to cover the entire surface of the touch panel in answer to the fitted positions on the edge portions of the touch panel, the sound signal oscillated by the input pen can be sensed firmly by the sound collecting members even if the input pen touches any position on the touch panel. As a result, it is possible to sense the touch position by a simple configuration with high precision.

In addition, since the identification of the touch position is performed by sensing the sound signal, that is oscillated from the input pen to propagate through the space, by virtue of the sound collecting members, there is no possibility that the vibration caused by driving the display device into which the touch panel is incorporated is detected as the noises rather than the case the identification of the touch position is performed by sensing the vibration propagated through the touch panel, like the conventional art. Thus, it is possible to perform the sensing of the touch position with high precision.

In order to achieve the above object, according to the second invention, in addition to the configuration of the first invention, the sound collecting members are microphones.

According to the touch panel device of the second invention, the sound signal such as the sound wave, the ultrasonic wave, etc., that is oscillated from the signal oscillating member in the input pen, can be sensed by the microphones acting as the sound collecting members.

In order to achieve the above object, according to the third invention, in addition to the configuration of the first invention, the sound collecting members are arranged at corner positions of the edge portions of the touch panel and have a 90-degree sound collecting directivity characteristic in a flat plane that is parallel to the touch panel.

According to the touch panel device of the third invention, when the sound collecting members are arranged at the corner positions of the edge portions of the touch panel, the sound collecting members have the 90-degree sound collecting directivity characteristic in a flat plane that is parallel to the touch panel since the range of the touch panel extending in the sound collecting direction of the sound collecting members is in the range of 90 degree. Therefore, even if the input pen touches any position on the touch panel, the sound signal oscillated from the input pen can be sensed without fail by the sound collecting members.

In order to achieve the above object, according to the fourth invention, in addition to the configuration of the first invention, the sound collecting members have a horn member to form an opening portion that is opened forward by an angle of 90 degree.

According to the touch panel device of the fourth invention, the sound collecting directivity characteristic of the sound collecting members can be set to 90 degree in the flat plane that is parallel to the touch panel by the horn member that forms the opening portion opened forward by the angle of 90 degree In order to achieve the above object, according to the fifth invention, in addition to the configuration of the first invention, the sound collecting members are arranged at middle positions of the edge portions of the touch panel and have a 180-degree sound collecting directivity characteristic in a flat plane that is parallel to the touch panel.

According to the touch panel device of the fifth invention, when the sound collecting members are arranged in the middle positions of the edge portions of the touch panel, the sound collecting members have the 180-degree sound collecting directivity characteristic in the flat plane that is parallel to the touch panel since the range of the touch panel extending in the sound collecting direction of the sound collecting members is in the range of 180 degree. Therefore, even if the input pen touches any position on the touch panel, the sound signal oscillated from the input pen can be sensed without fail by the sound collecting members.

In order to achieve the above object, according to the sixth invention, in addition to the configuration of the first invention, the signal oscillating member is composed of a piezoelectric loudspeaker containing a piezoelectric element.

According to the touch panel device of the sixth invention, the sound signal such as the acoustic wave, the ultrasonic wave, or the like can be oscillated from the piezoelectric loudspeaker containing the piezoelectric element.

In order to achieve the above object, according to the seventh invention, in addition to the configuration of the fifth or sixth invention, the input pen has an opening portion formed at a top end portion, and the sound signal that is output by the signal oscillating means being built in the input pen is oscillated from the opening portion to have a directivity of 360 degree around a penholder of the input pen.

According to the touch panel device of the seventh invention, when the input pen touches the touch panel, the sound signal being output from the signal oscillating means built in the input pen is oscillated from the opening portions formed at the pen point portion of the input pen around the penholder of the input pen to have the directivity of 360°. Therefore, everywhere the input pen touches the touch panel, the sound signal can be sensed by the sound collecting members and thus the touch position can be identified without fail.

In order to achieve the above object, according to the eighth invention, in addition to the configuration of the first invention, an inner wall surface of the pen point portion of the input pen is formed as a circular cone shape such that a diameter is reduced smaller toward a top end side, an inside of the circular cone shape is communicated to an outside via an opening portion that is formed on a top end of the input pen, and the sound signal output from the signal oscillating means via the inside of the circular cone shape formed at the pen point portion of the input pen is oscillated from the opening portion.

According to the touch panel device of the eighth invention, the inner wall surface of the pen point portion of the input pen, through which the sound signal being output from the signal oscillating means built in the input pen is passed, is formed as the circular cone shape. Therefore, the sound signal being oscillated from the opening portion formed at the top end can have the non-directivity.

In order to achieve the above object, according to the ninth invention, in addition to the configuration of the first invention, a top end of the input pen is formed like a spherical shape, and opening portions that oscillate the sound signal being output from the signal oscillating means to an outside are formed on an outer peripheral surface of the input pen in rear of the top end being formed like a spherical shape.

According to the touch panel device of the ninth invention, since the top end of the input pen is formed like the spherical shape, it can be prevented that the surface of the touch panel is damaged when the input pen touches the touch panel. In addition, since the opening portions formed to oscillate the sound signal being output from the signal oscillating means to the outside are formed on the outer peripheral surface in rear of the spherical top end of the input pen, it can be prevented that the oscillation of the sound signal is disturbed by blocking the opening portions when the input pen touches the touch panel.

In order to achieve the above object, according to the tenth invention, in addition to the configuration of the first invention, the input pen has a battery member that supplies a drive power to the signal oscillating means therein, a holder for holding the input pen is prepared, a charging member is built in the holder, and the battery member of the input pen is charged by the charging member when the input pen is held by the holder.

According to the touch panel device of the tenth invention, if the input pen is held in the pen holder when the input pen is not used, the battery member built in the input pen can be charged by the charging member built in the pen holder.

In order to achieve the above object, according to the eleventh invention, in addition to the configuration of the first invention, an oscillating signal absorbing member for absorbing the sound signal oscillated from the signal oscillating means is provided to edge portions of the touch panel.

According to the touch panel device of the eleventh invention, the sound signal, that reaches the edge portions of the touch panel other than the portion to which the sound collecting members are provided, out of the sound signal oscillated from the signal oscillating means in the input pen can be absorbed by the sound signal absorbing member without reflection. Therefore, the noises caused by the reflected wave can be prevented from being sensed by the sound collecting members, and thus the touch position can be identified with high precision.

In order to achieve the above object, according to the twelfth invention, in addition to the configuration of the first invention, the flat display device consists of a plasma display panel.

According to the touch panel device of the twelfth invention, the touch position of the input pen can be sensed on the display screen of the plasma display panel.

DETAILED DESCRIPTION OF THE PRESENT INVENTION

Preferred embodiments of the present invention will be explained with reference to the accompanying drawings hereinafter.

Figure 1:
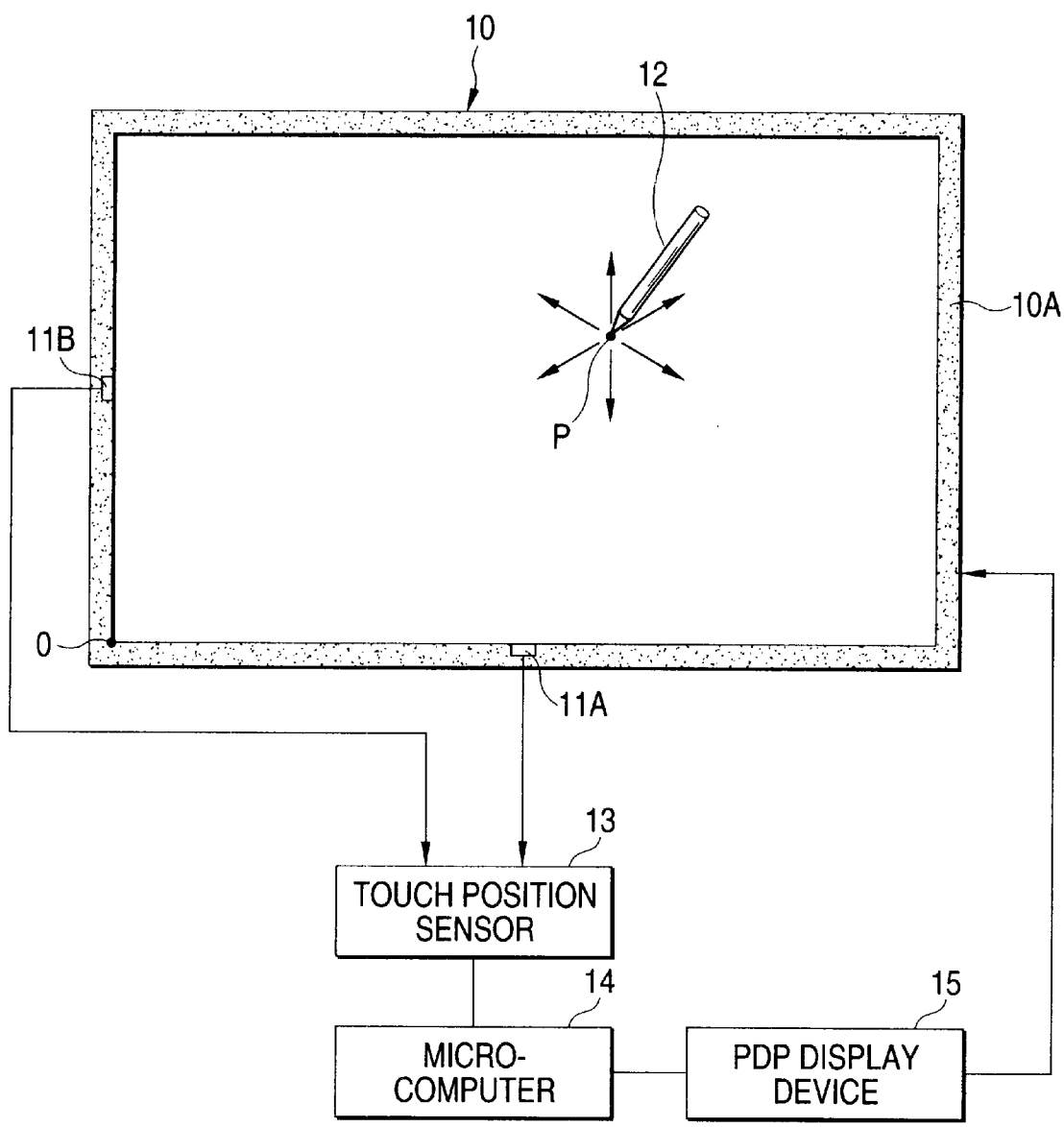
FIG. 1 is a view showing a configuration of an example in an embodiment of the present invention.

FIG. 1 is a view showing a configuration of a first example in the embodiment of the touch panel device according to the present invention.

In the following, explanation will be made while taking as an example the case where the touch panel device is fitted in front of the plasma display panel (abbreviated as "PDP" hereinafter). But the touch panel device may be fitted to the white board and the tablet in addition to PDP.

In FIG. 1, a front glass substrate of the PDP constitutes a touch panel 10 of the touch panel device. The touch panel device comprises two microphones 11A and 11B provided to a center position of a lower edge portion and a center position of a left-hand edge portion of a front surface of the touch panel 10 respectively; an input pen 12 built in a ultrasonic oscillator described later; and a touch position sensor 13 that is connected to two microphones 11A and 11B and senses a touch position on the touch panel 10 by the input pen 12 based on the ultrasonic wave which is input from the input pen 12 into the microphones 11A and 11B.

The touch position sensor 13 is connected to a microcomputer 14 such that a sensed signal of the touch position is output from the touch position sensor 13 to the microcomputer 14.

Then, the microcomputer 14 executes the screen display in response to the touch position on the touch panel 10 by the input pen 12 by outputting a control signal to the PDP display device 15, that is connected to the microcomputer 14, based on the sensed signal of the touch position input from the touch position sensor 13 to control the drive of the PDP display device 15.

A sound absorbing wall 10A that absorbs the ultrasonic wave is provided to a peripheral portion of touch panel 10 such that it buries the microphones 11A, 11B and it rises forward from the front surface of the touch panel 10.

Figure 2:
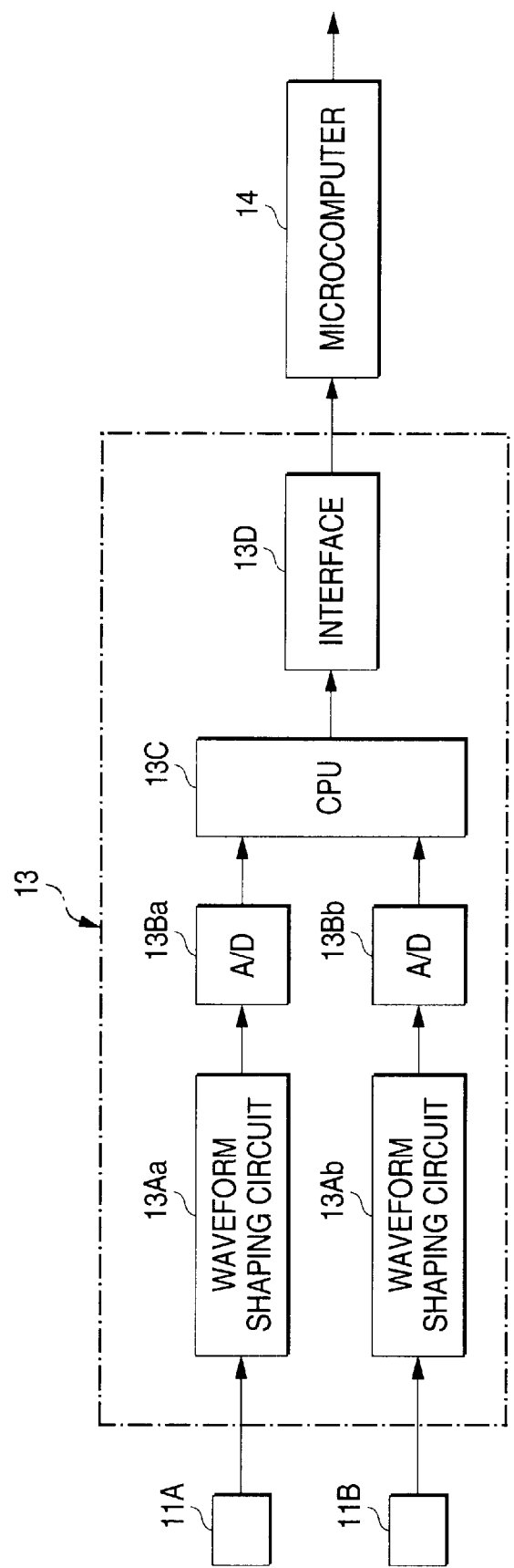
FIG. 2 is a block diagram showing a configuration of a pointing position sensor in the same example.

FIG. 2 is a block diagram showing a configuration of the touch position sensor 13.

In FIG. 2, the touch position sensor 13 comprises waveform shaping circuits 13A$a$, 13A$b$ connected to the microphones 11A and 11B respectively to amplify/waveform-shape the sensed signal of the ultrasonic wave input from the microphones 11A and 11B; A/D converter circuits 13B$a$, 13B$b$ connected to the waveform shaping circuits 13A$a$, 13A$b$ respectively to A/D-convert the waveform-shaped signal output from the waveform shaping circuits 13A$a$, 13A$b$; a CPU 13C connected to the A/D converter circuits 13B$a$, 13B$b$ to calculate coordinate values of a touch position P (see FIG. 1) based on the A/D converted signals of the ultrasonic wave being input from the A/D converter circuits 13B$a$, 13B$b$ respectively; and an interface 13D for connection the CPU 13C and the microcomputer 14.

Figure 3:
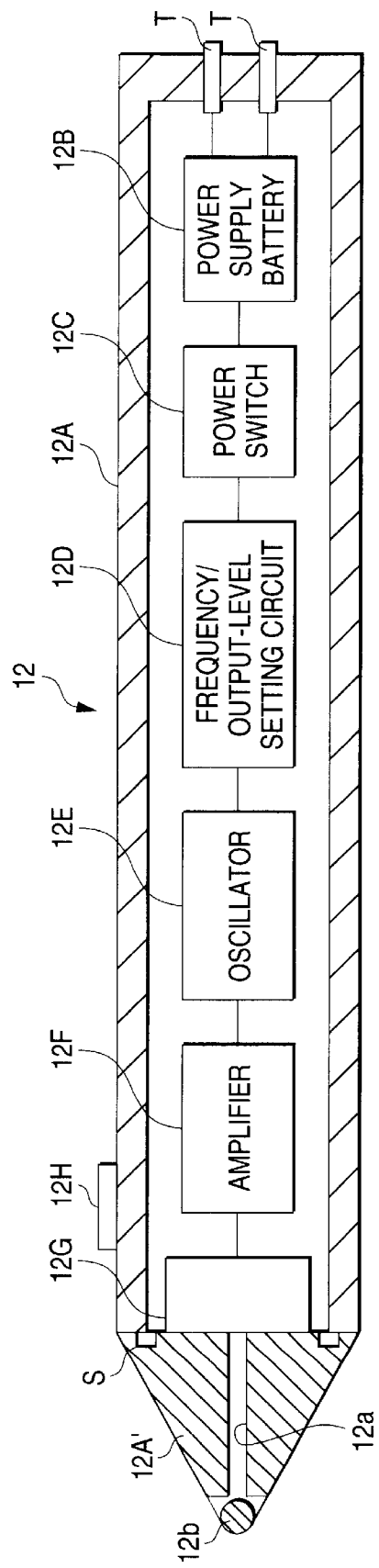
FIG. 3 is a side sectional view showing a configuration of an input pen in the same example.

FIG. 3 is a side sectional view showing a configuration of the input pen 12.

In FIG. 3, a casing 12A of the input pen 12 has a pen-like hollow shape whose pen point portion 12A' has a circular cone shape. A cylindrical hole 12$a$ that extends along the axis direction and has a diameter of 1 mm is formed at the center portion of the pen point portion 12A'.

Figure 4:
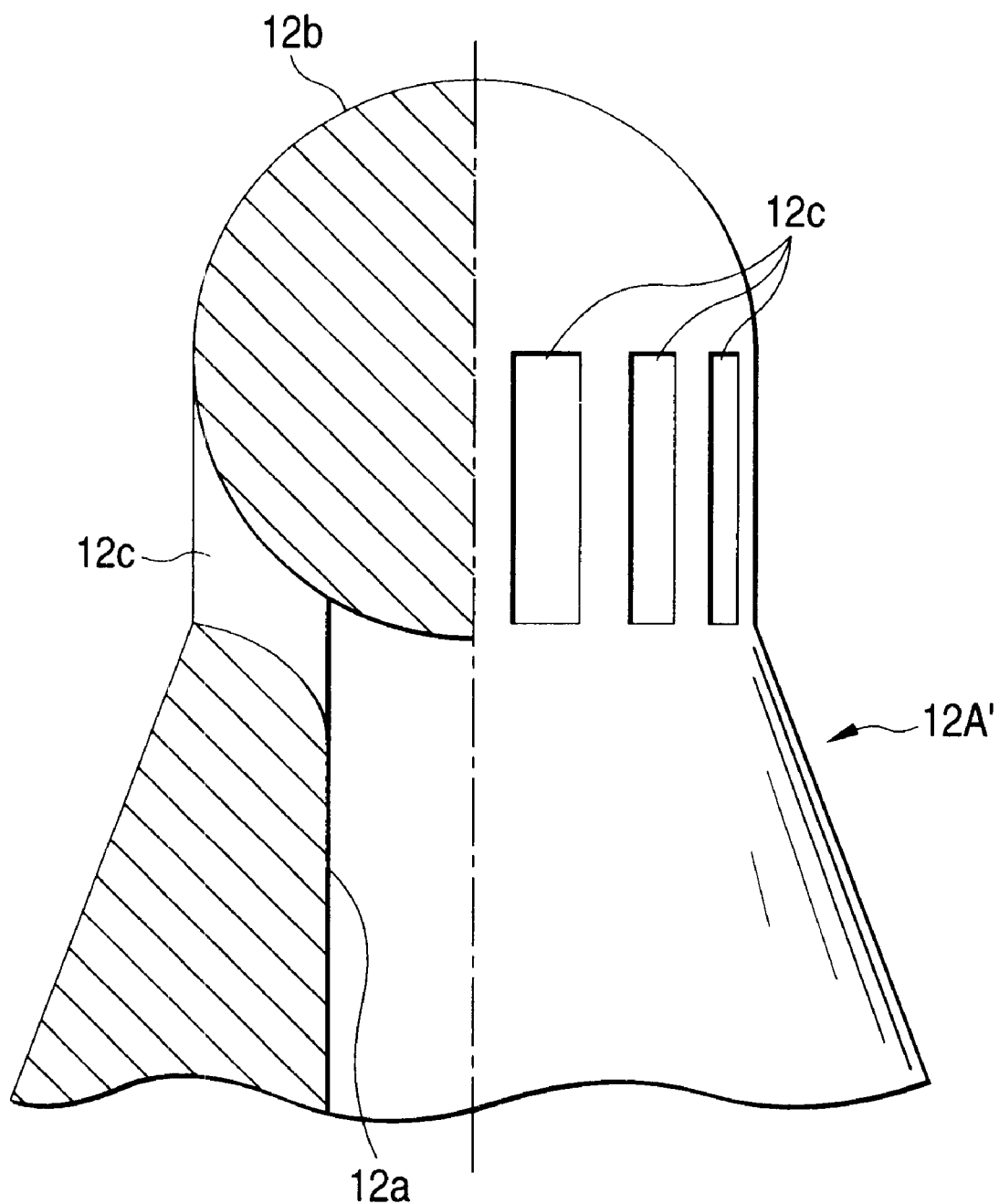
FIG. 4 is an enlarged view, one side of which is sectioned, showing a structure of a pen point portion of the input pen.

Then, as shown in FIG. 4 in an enlarged fashion, a ball portion 12$b$ is formed integrally with the pen point portion 12A' of the casing 12A. The ball portion 12$b$ faces to a top end opening portion of the cylindrical hole 12$a$. The cylindrical hole 12$a$ is communicated to the outside via a plurality of opening portions 12$c$ that are formed on an outer peripheral wall of the pen point portion 12A' at an equiangular interval so as to oppose to a rear portion of the ball portion 12$b$.

The ball portion 12$b$ is formed of resin such as PET, nylon, Teflon, etc., or felt, etc., for example, not to damage a surface of the touch panel 10 when the pen point portion 12A' of the input pen 12 is brought into contact with the touch panel 10.

In FIG. 3, a power supply battery 12B, a power switch 12C, a frequency/output-level setting circuit 12D, an oscillator 12E, an amplifier circuit 12F, and a piezoelectric loudspeaker 12G consisting of a piezoelectric device are built in a main body of the casing 12A.

This piezoelectric loudspeaker 12G is fitted adjacent to the rear opening portion of the cylindrical hole 12$a$.

Also, a touch sensor S for sensing the fact that the ball portion 12$b$ being formed at the top end of the pen point portion 12A' touches the touch panel 10 is provided at a connected portion between the pen point portion 12A' and the main body portion of the casing 12A. An LED 12H is provided on an outer peripheral surface of the main body portion.

In this case, a microswitch may used in place of the touch sensor S.

Further, a pair of charging terminals T connected to the power supply battery 12B are buried in a rear end surface of the casing 12A so as to expose their end portions from the outer surface.

Figure 5:
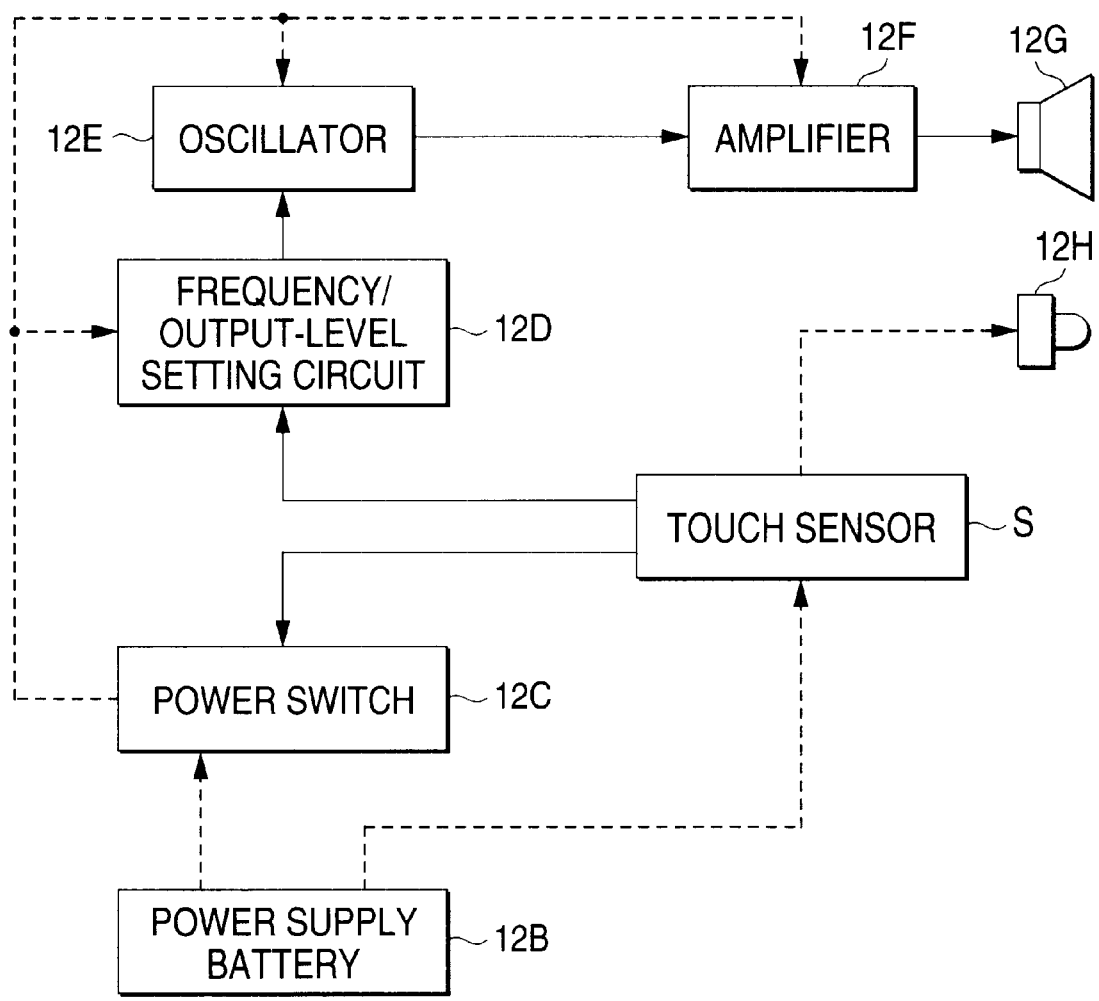
FIG. 5 is a block diagram showing an example of internal circuit connection of the input pen.

FIG. 5 is a block diagram showing internal circuit connection state of the input pen 12. In FIG. 5, a solid line denotes a power line, and a broken line denotes a signal/control line.

In FIG. 5, the power switch 12C is connected to the power supply battery 12B that is charged by a charger, described later, via the charging terminals T. In addition, the power is supplied to the frequency/output-level setting circuit 12D, the oscillator 12E, and the amplifier circuit 12F via the power switch 12C.

The frequency/output-level setting circuit 12D is connected to the oscillator 12E to set a frequency or output level of the ultrasonic signal being output from the oscillator 12E.

Then, the oscillator 12E is connected to the piezoelectric loudspeaker 12G via the amplifier circuit 12F. When the ultrasonic signal that is output from the oscillator 12E and then amplified by the amplifier circuit 12F is input into the piezoelectric loudspeaker 12G, the ultrasonic wave having the desired frequency or output level set by the frequency/output-level setting circuit 12D is oscillated into the cylindrical hole 12$a$ of the casing 12A from the piezoelectric loudspeaker 12G (see FIG. 3).

The touch sensor S is connected to the power switch 12C. The touch sensor S turns ON the power switch 12C when it senses the event that the ball portion 12$b$ at the top end portion of the casing 12A comes into contact with the touch panel 10, whereas the touch sensor S turns OFF the power switch 12C when the ball portion 12$b$ does not touch the touch panel 10.

As the touch sensor S, there may be listed a pressure sensor, for example, which senses a pressure generated when the ball portion 12$b$ of the pen point portion 12A' is pushed against the touch panel 10 and then turns ON the power switch 12C.

Then, the LED 12H is connected to the power switch 12C via the touch sensor S. When the touch sensor S senses that the ball portion 12$b$ at the top end portion of the casing 12A touches the surface of the touch panel 10, the LED 12H as a light emitting device is turned ON by supplying the power from the power supply battery 12B.

Figure 6:
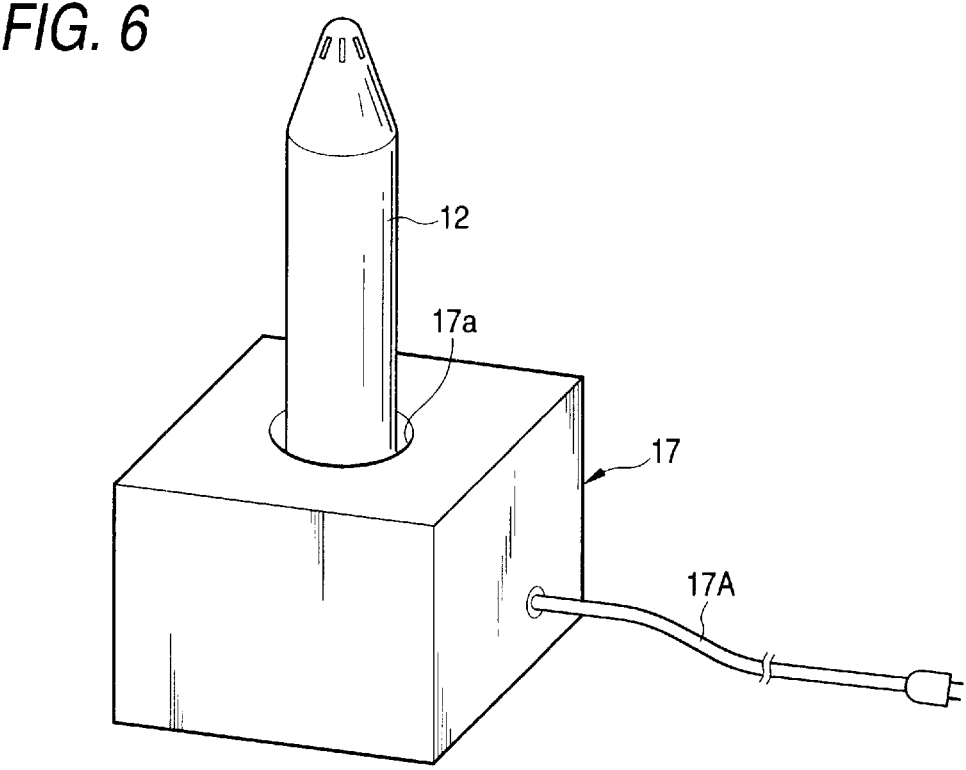
FIG. 6 is a perspective view showing a penholder to hold the input pen.

FIG. 6 is a perspective view showing the situation that the input pen 12 is held in a penholder 17.

In FIG. 6, a fitting hole 17a having an inner diameter that is slightly larger than an outer diameter of the casing 12A of the input pen 12 is formed vertically in a center portion of the penholder 17. The input pen 12 is held upright when the rear end portion of the input pen 12 is fitted into the fitting hole 17a.

Then, charging terminals (not shown) are formed at positions, which the charging terminals T provided to the rear end surface of the input pen 12 being fitted into the fitting hole 17a are brought into contact with, on a bottom surface of the fitting hole 17a of the penholder 17. A power cord 17A is connected to the charging terminals. Thus, the charging terminals are connected to an AC power supply via the power cord 17A.

Figure 7:
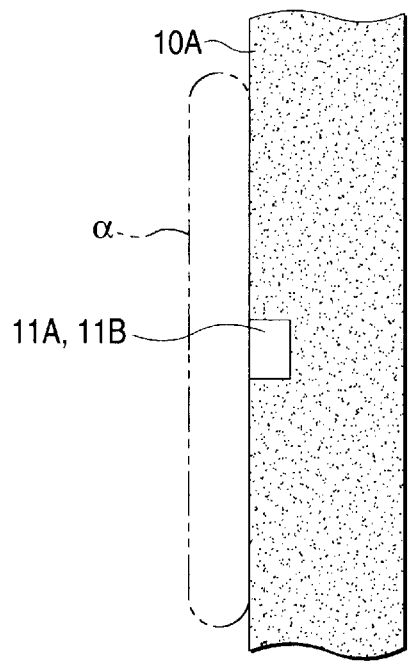
FIG. 7 is a view showing a fitting state of microphones in the same example.

FIG. 7 is a schematic view showing a fitting state of the microphones 11A, 11B.

The microphones 11A, 11B consists of a capacitor microphone, and are provided at a center position of a lower edge portion and a center position of a left-hand edge portion of the front surface of the touch panel 10. Thus, in order to have the directivity over the entire surface of the touch panel 10, the microphones 11A, 11B are buried in the sound absorbing wall 10A such that sound receiving surfaces are arranged to form a substantially equal surface to an inner wall surface of the sound absorbing wall 10A.

Accordingly, as shown by a chain double-dashed line α, the microphones 11A, 11B are set to have the 180° direction characteristic.

Next, a method of sensing the touch position on the touch panel by using the above touch panel device will be explained hereunder.

While the input pen 12 is fitted and held in the fitting hole 17a of the pen holder 17 that is connected to the AC power supply via the power cord 17A, the charging terminals provided to the bottom surface of the fitting hole 17a comes into contact with the charging terminals T provided to the rear end surface of the input pen 12, and thus the power supply battery 12B is charged (see FIG. 7).

Then, as shown in FIG. 1, when the pen point (the ball portion 12b of the pen point portion 12A') of the input pen 12 in which the power supply battery 12B has been charged touches any position (referred to as a "touch position" hereinafter) P of the touch panel 10, the touch sensor S senses the contact between the ball portion 12b and the touch panel 10 according to a contact pressure at that time.

Then, the LED 12H of the input pen 12 is turned ON when the current is supplied to the LED 12H from the power supply battery 12B since the touch sensor S is turned ON. Accordingly, the operator can see that the pen point of the input pen 12 has perfectly touched the touch panel 10.

At this time, because the opening portions 12c of the input pen 12 that oscillate the ultrasonic wave are formed at the rear position of the ball portion 12b, the opening portions 12c are never blocked by the touch of the input pen 12 onto the touch panel 10 and thus the oscillation of the ultrasonic wave is in no way disturbed.

The power switch 12C is turned ON when the touch sensor S is turned ON. Then, the power is supplied from the power supply battery 12B to the frequency/output-level setting circuit 12D, the oscillator 12E, and the amplifier circuit 12F respectively.

Accordingly, the oscillator 12E generates the ultrasonic signal having the frequency or the output level being set by the frequency/output-level setting circuit 12D, and then outputs it to the amplifier circuit 12F. The amplifier circuit 12F amplifies the ultrasonic signal, and then outputs it to the piezoelectric loudspeaker 12G.

Then, the piezoelectric loudspeaker 12G outputs the ultrasonic wave having the predetermined oscillation frequency (e.g., 20 to 100 KHz) based on the ultrasonic signal being input from the amplifier circuit 12F. The ultrasonic wave oscillated from the piezoelectric loudspeaker 12G is passed through the cylindrical hole 12a of the casing 12A and is then oscillated from a plurality of opening portions 12c formed on the outer peripheral surface of the pen point portion 12A'.

At this time, since the opening portions 12c are formed on the outer peripheral surface of the pen point portion 12A' at the equiangular interval, the ultrasonic wave is oscillated around the penholder of the input pen 12 over 360° and is spread toward the outer edge portion along the surface of the touch panel 10.

Then, the ultrasonic wave oscillated from the input pen 12 is sensed by the microphones 11A and 11B that are provided at the center position of the lower edge portion and the center position of the left-hand edge portion of the touch panel 10 respectively.

At this time, the microphones 11A and 11B have the direction characteristic of 180° as described above. Therefore, everywhere the input pen 12 touches the touch panel 10, the microphones 11A and 11B can sense the ultrasonic wave oscillated from the input pen 12.

When the ultrasonic wave is sensed by the microphones 11A and 11B, the microphones 11A and 11B output the ultrasonic sensed signal based on the sensed ultrasonic wave to the touch position sensor 13 respectively.

As shown in FIG. 2, the ultrasonic sensed signal being input into the touch position sensor 13 is input into the waveform shaping circuit 13Aa, 13Ab respectively, and then amplified and waveform-shaped by the waveform shaping circuit 13Aa, 13Ab, and then A/D-converted by the A/D converter circuits 13Ba, 13Bb, and then input into the CPU 13C.

Then, the CPU 13C executes the calculation to identify the cooperation of the touch position P, based on a digital ultrasonic sensed signal being output from the A/D converter circuits 13Ba, 13Bb.

In order to identify the coordinate of the touch position P, the calculation is carried out in the CPU 13C by calculating distances from the microphones 11A, 11B to the touch position P and then calculating the coordinate value of the touch position P by setting the lower left-hand corner O of the touch panel 10 as an origin, for example.

The calculation of the distances from the microphones 11A, 11B to the touch position P will be performed by the following method.

That is, a first method is a calculation method that is performed based on a level of the ultrasonic wave sensed by the microphones.

The level of the ultrasonic wave obtained when the ultrasonic wave reaches the microphones 11A, 11B is reduced lower than a level obtained when the ultrasonic wave is oscillated from the input pen 12, in response to the distance between the microphones 11A, 11B and the touch position P. For this reason, the distance to the touch position P is calculated based on the level reduction rate obtained by comparing the constant level of the ultrasonic wave that is oscillated from the input pen 12 with respective levels of the ultrasonic waves that are sensed by the microphones 11A, 11B.

Also, distances to the touch position P may be calculated based on a resultant ratio by comparing levels of the ultrasonic waves that are sensed by the microphones 11A, 11B respectively.

A second method is a calculation method that is performed based on phase of the ultrasonic wave sensed by the microphones 11A, 11B respectively.

The second method calculates the distances to the touch position P based on respective phases of the ultrasonic waves that are sensed by the microphones 11A, 11B.

Figure 8:
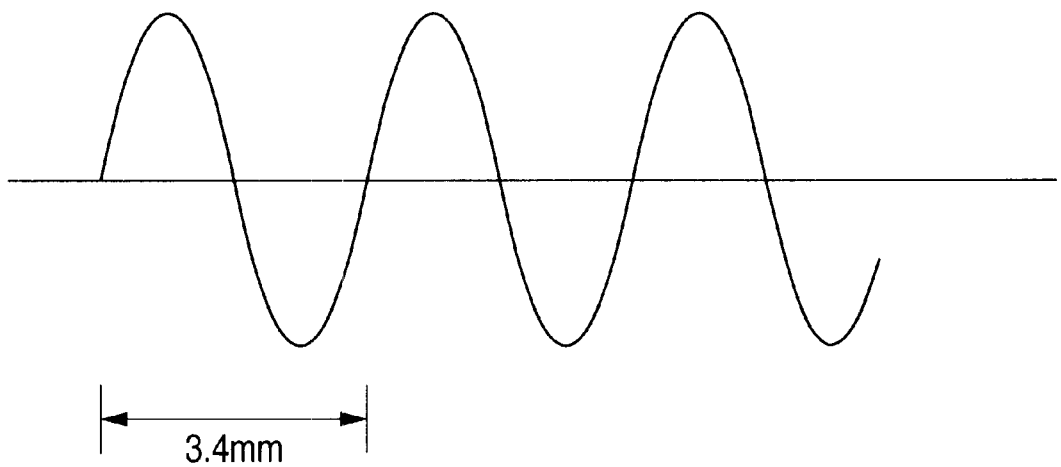
FIG. 8 is a waveform view showing a ultrasonic wave.

For example, in FIG. 8 showing a waveform of the ultrasonic wave, if the frequency of the ultrasonic wave oscillated from the input pen 12 is 100 KHz, a length of one period of the ultrasonic wave becomes 3.4 mm because the acoustic velocity is 340 mm/sec.

Accordingly, the distance to the touch position P can be calculated by detecting to which phase in which period of the ultrasonic wave the phase that have reached the microphones 11A, 11B respectively corresponds.

A third method is a calculation method that is performed based on phase difference generated between the ultrasonic waves sensed by the microphones 11A, 11B when the input pen 12 is moved on the touch panel.

The third method previously detects the phase of the ultrasonic wave oscillated from a designated position after any position on the touch panel 10 is designated previously by the operator, then compares the phase of the ultrasonic wave oscillated from the designated position with the phase of the ultrasonic wave oscillated from the touch position of the input pen different from the designated position, and then calculates the distance to the touch position by detecting the phase displacement therebetween.

Figure 9:
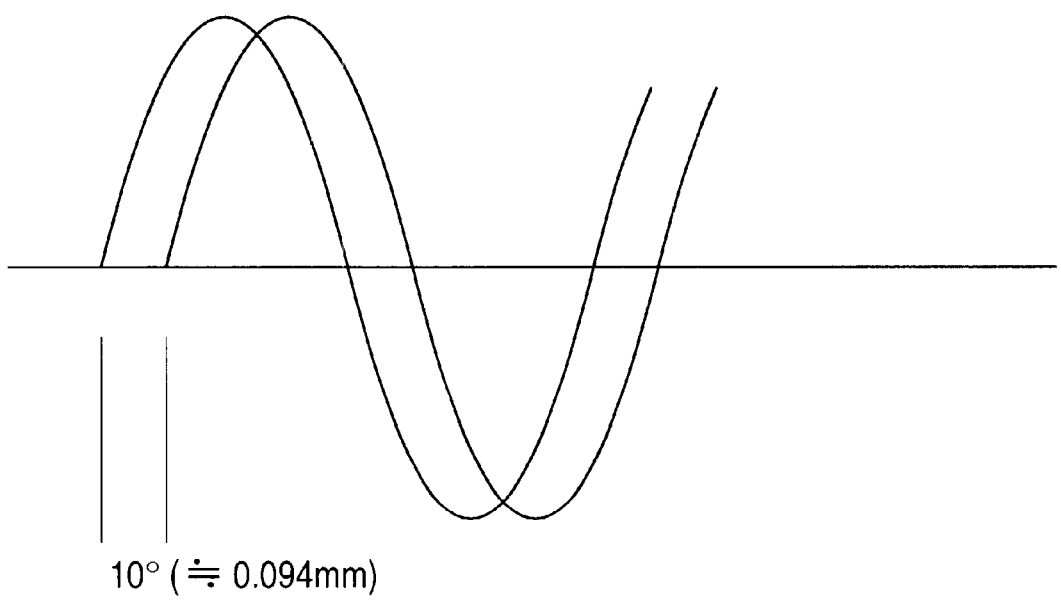
FIG. 9 is a waveform view showing a phase displacement of the ultrasonic wave.

More particularly, in FIG. 8, as mentioned above, if the frequency of the ultrasonic wave oscillated from the input pen is 100 KHz, a length of one period of the ultrasonic wave becomes 3.4 mm because the acoustic velocity is 340 mm/sec. Hence, as shown in FIG. 9, if a phase different in the ultrasonic waves that are sensed between the first touch position and the moved touch position is given as 10°, a distance of the input pen at the touch position on the touch panel from the designated position is given by $$3.4\ mm \times 10/360 \approx 0.094\ mm.$$

Accordingly, the distance between the touch position P and the microphones 11A, 11B can be calculated based on the distance between the calculated touch position and the designated position.

A fourth method is a calculation method using the Doppler effect of the ultrasonic wave being oscillated from the input pen.

The fourth method designates previously any position on the touch panel 10 to detect the distance between this designated position and the microphones 11A, 11B, then detects a moving velocity and the moving direction of the touch position P based on the Doppler effect generated when the input pen 12 is moved from the designated position on the touch panel 10, and then calculates the distances between the touch position P and the microphones 11A, 11B after the movement.

After the touch position sensor 13 calculates respective distances between the touch position P and the microphones 11A, 11B according to any one method, it performs the calculation of the coordinates (X, Y) of the touch position P.

Figure 10:
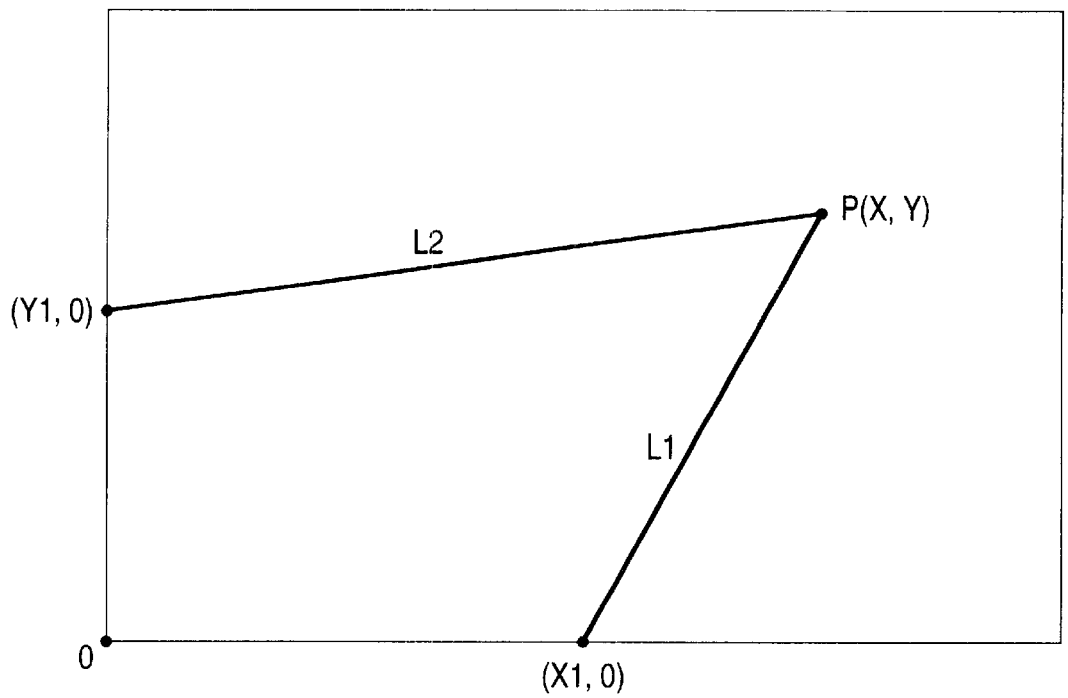
FIG. 10 is a view showing a method of calculating a distance to a touch position.

That is, as shown in FIG. 10, assumed that the lower left-hand corner portion o of the touch panel 10 is set as the origin, the coordinates of the fitted position of the microphones 11A, 11B are set as (X1,0), (0,Y1) respectively, and the distances from the microphones 11A, 11B to the touch position P are set as L1, L2 respectively, then $$L1^2 = (X-X1)^2 + Y^2$$

$$L2^2 = X^2 + (Y-Y1)^2$$

are given. Values of the coordinates (X,Y) of the touch position P can be calculated by solving the simultaneous equation.

Data of the coordinates (X,Y) of the touch position P calculated in this manner are output from the touch position sensor 13 to the microcomputer 14 via the interface 13D Then, the microcomputer 14 searches image data corresponding to the coordinates (X,Y) of the touch position P from the database in which the image data are stored previously, and then outputs the image data signal to the PDP display device 15. Then, the PDP display device 15 displays the desired images, e.g., the moving locus of the touch mark or the touch position, on the screen of the PDP based on the image data signal.

In the above example, the touch position is identified by using the ultrasonic wave. But the AM- or FM-modulated signal may be used, otherwise the intermittent wave may be used.

Also, in the above example, the microphones 11A and 11B are provided at the center position of the lower edge portion and the center position of the left-hand edge portion of the touch panel 10 respectively. Even though the microphones 11A and 11B are arranged at any places, the coordinates (X,Y) of the touch position P can be identified, like the above, if such microphones 11A and 11B are arranged at different positions on the edge portions of the touch panel 10.

Figure 11:
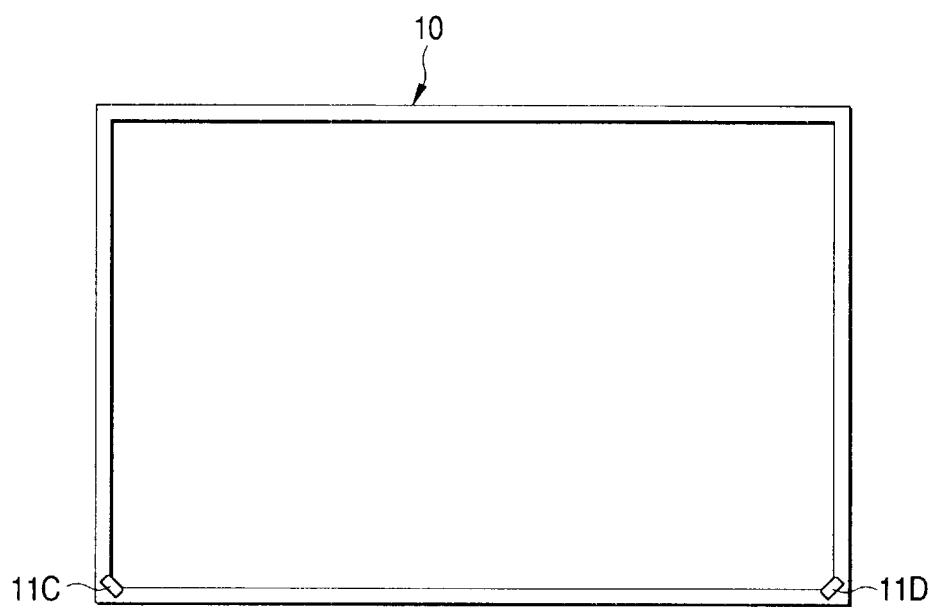
FIG. 11 is a view showing another example of arrangement of the microphones.

FIG. 11 is a view showing an arrangement example in which a pair of microphones are placed on the corners of the touch panel respectively.

In FIG. 11, the microphones 11C and 11D are arranged at the lower left-hand corner portion and the lower right-hand corner portion of the touch panel 10 respectively. But they may be arranged on other corners.

Figure 12:
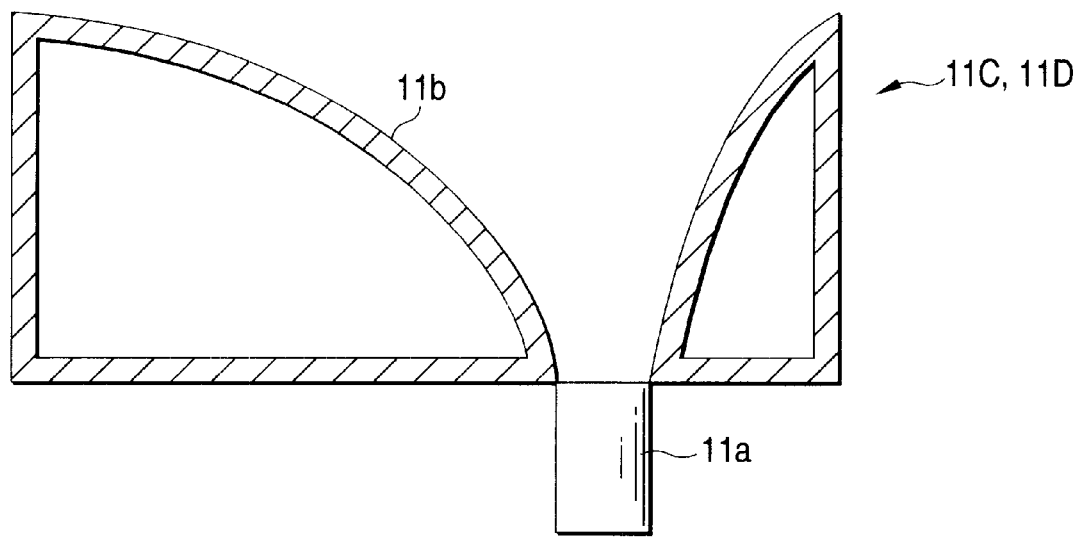
FIG. 12 is a side sectional view showing a configuration of the microphones that have a direction characteristic of 90 degree.
Figure 13:
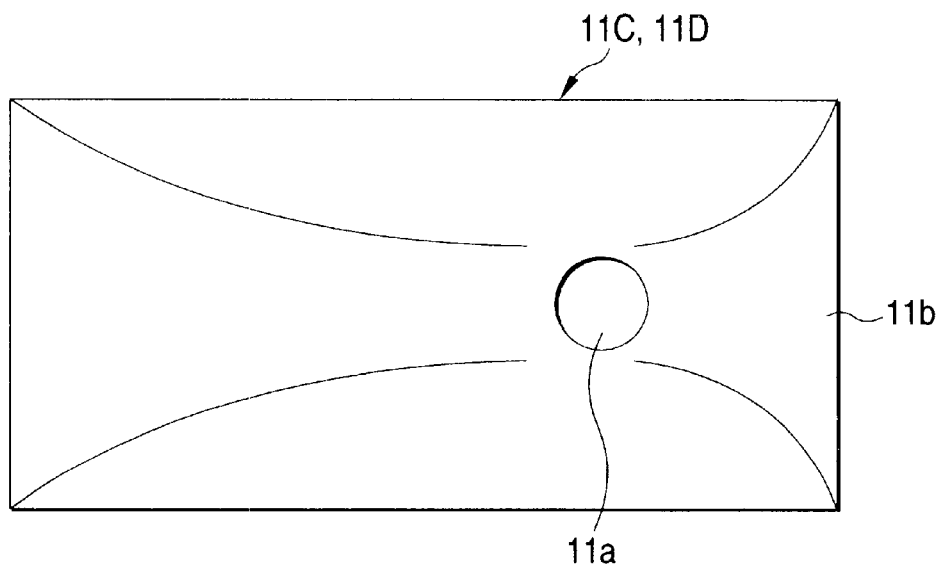
FIG. 13 is a front view showing the microphone.

If the microphones 11C, 11D are arranged on the corner portions of the touch panel 10, like this example, the microphone that has a directivity of 90 degree, as shown in FIG. 12 and FIG. 13, are used as the microphones 11C, 11D.

Figure 14:
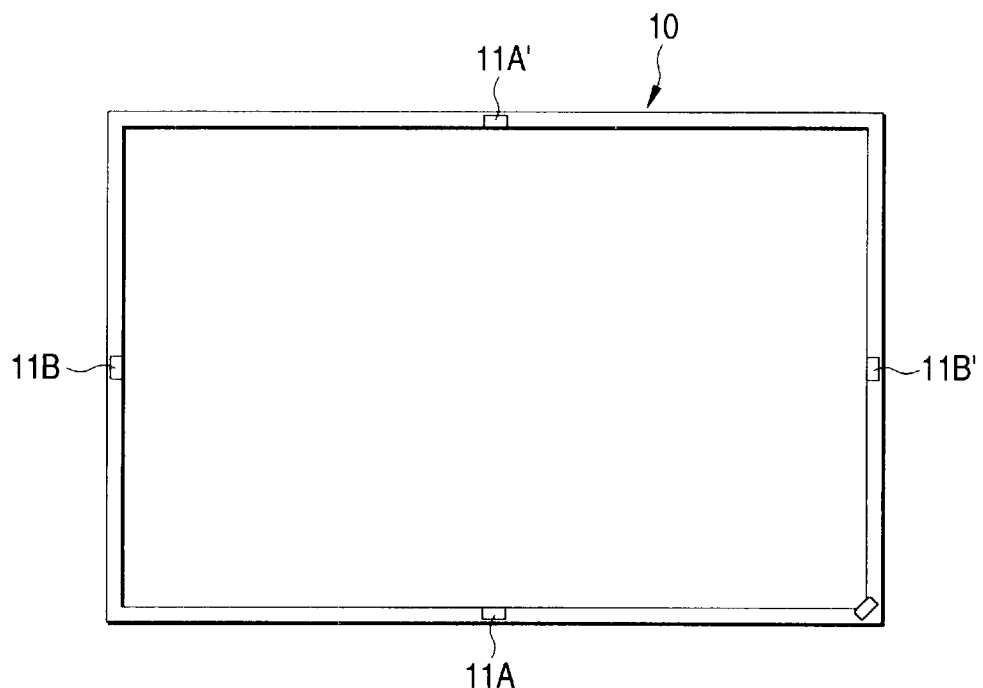
FIG. 14 is a view showing still another example of arrangement of the microphone.
Figure 15:
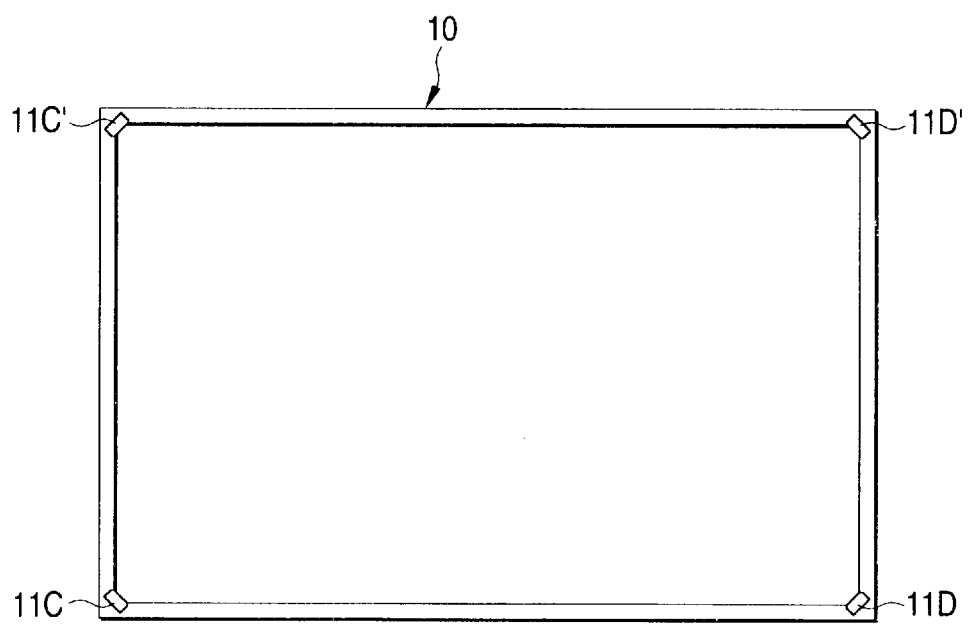
FIG. 15 is a view showing still another example of arrangement of the microphone.
Figure 16:
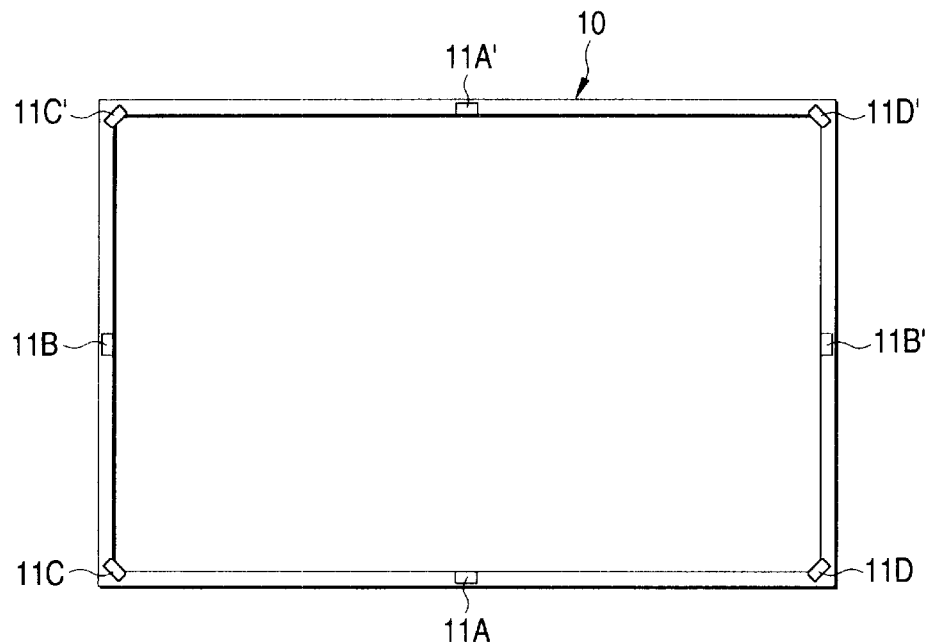
FIG. 16 is a view showing still another example of arrangement of the microphone.

That is, in the microphones 11C, 11D, a horn 11$b$ that forms the directivity of 90 degree is provided to a front portion of a capacitor microphone 11$a$ FIGS. 14 to 16 show an arrangement example in which three microphones or more are arranged on the touch panel 10 respectively.

In other words, FIG. 14 shows an arrangement example in which four microphones 11A, 11B, 11A', 11B' that have the directivity of 180 degree are arranged at center positions of four sides of the touch panel 10 respectively. FIG. 15 shows an arrangement example in which four microphones 11C, 11D, 11C', 11D' that have the directivity of 90 degree are arranged on four corner portions of the touch panel 10 respectively. FIG. 16 shows an arrangement example in which eight microphones, i.e. four microphones 11A, 11B, 11A', 11B' that have the directivity of 180 degree and four microphones 11C, 11D, 11C', 11D' that have the directivity of 90 degree, are arranged in total at the center positions of four sides and on four corner portions of the touch panel 10 respectively.

In this manner, in case three microphones or more are arranged on the touch panel, the coordinates of the touch position can be identified by selecting two signals on which no noise is superposed from the ultrasonic signals detected by these microphones, calculating the average of calculated values of the coordinate based on the ultrasonic signals detected by every two microphones that are selected according to permutation/combination, selecting two ultrasonic signals detected by two microphones that are closest to the touch position, or the like.

As described above, if the coordinates of the touch position are identified based on the ultrasonic signals detected by three microphones or more, the improvement in the detection precision can be achieved.

In case the microphones are arranged at the center positions of the edge portions of the touch panel, such microphones may have the directivity of 180 degree. Therefore, this case has such an advantage that a configuration of the microphone can be simplified rather than the case where the microphones are constructed to have the directivity of 90 degree when they are arranged on the corner portions. In addition, in case the microphones are arranged on the corner portions of the touch panel, it seems that the microphones seldom disturbs the display image and also the input pen hardly touches the corner portions of the touch panel. Therefore, this case has such an advantage that the touch position can be sensed without fail.

Figure 17:
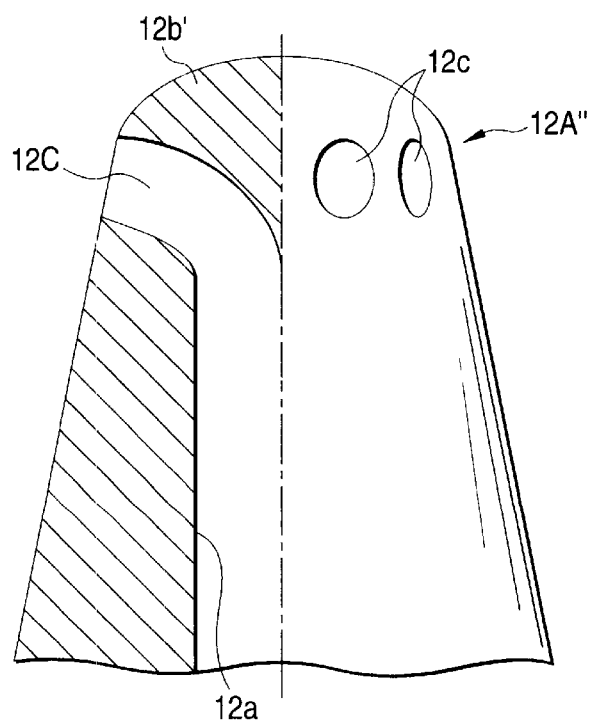
FIG. 17 is an enlarged view, one side of which is sectioned, showing another structure of a pen point portion of the input pen.

FIG. 17 is an enlarged view showing another example of a structure of a pen point portion (pen point) of the input pen, while sectioning one side of the view.

In FIG. 17, a top end surface 12b' of the pen point portion 12A' of the input pen is formed like a hemispherical shape. A plurality of circular opening portions 12c' that enable the cylindrical hole 12a to communicate with the outside are formed on a rear outer peripheral surface of the hemispherical top end surface 12b' at an equiangular interval.

In the input pen in this example, like the case of the pen point of the input pen shown in FIG. 4, when the pen point touches the touch panel, there is no possibility that the opening portions 12c' are blocked and thus the ultrasonic wave passed through the cylindrical hole 12a is oscillated without fail to the outside via the opening portions 12c'.

Figure 18:
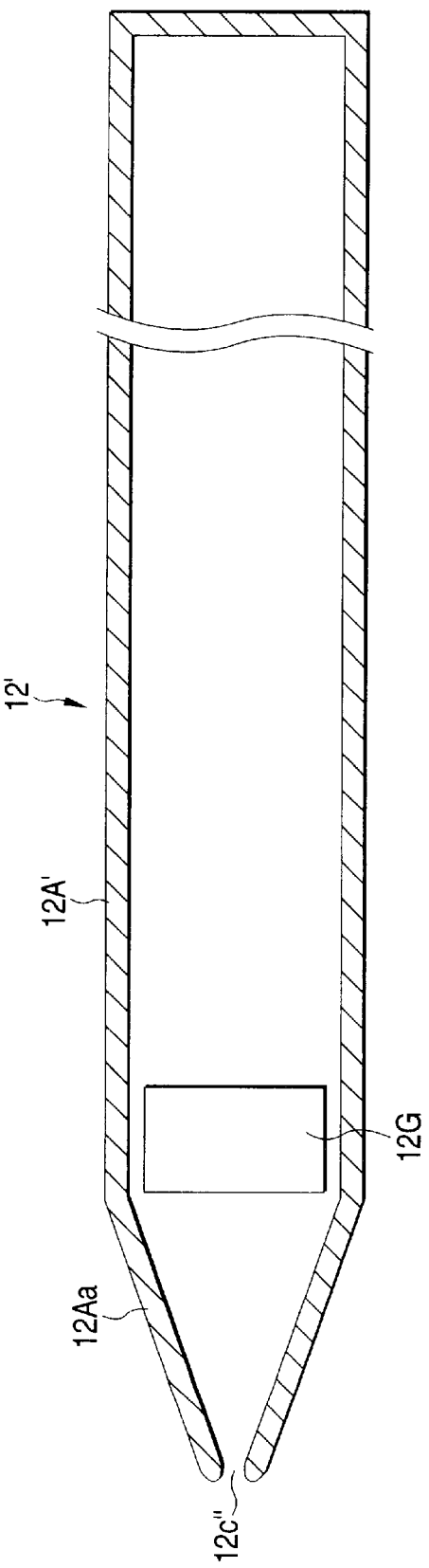
FIG. 18 is a side sectional view showing another configuration of a casing of the input pen.

FIG. 18 is a sectional view showing another example of a configuration of the input pen.

In FIG. 18, the casing 12A' of the input pen 12' is formed like a circular cone shape such that an inner diameter of an inner wall surface of the pen point portion 12Aa is reduced smaller toward the top end side. An opening 12c'' whose diameter is 1 mm is formed at the top end.

Since the inner wall surface of the pen point portion 12Aa of the input pen 12' has the circular cone shape, the ultrasonic wave that is oscillated from the piezoelectric loudspeaker 12G built in the casing 12A' through the opening 12c'' has non-directivity.

Figure 19:
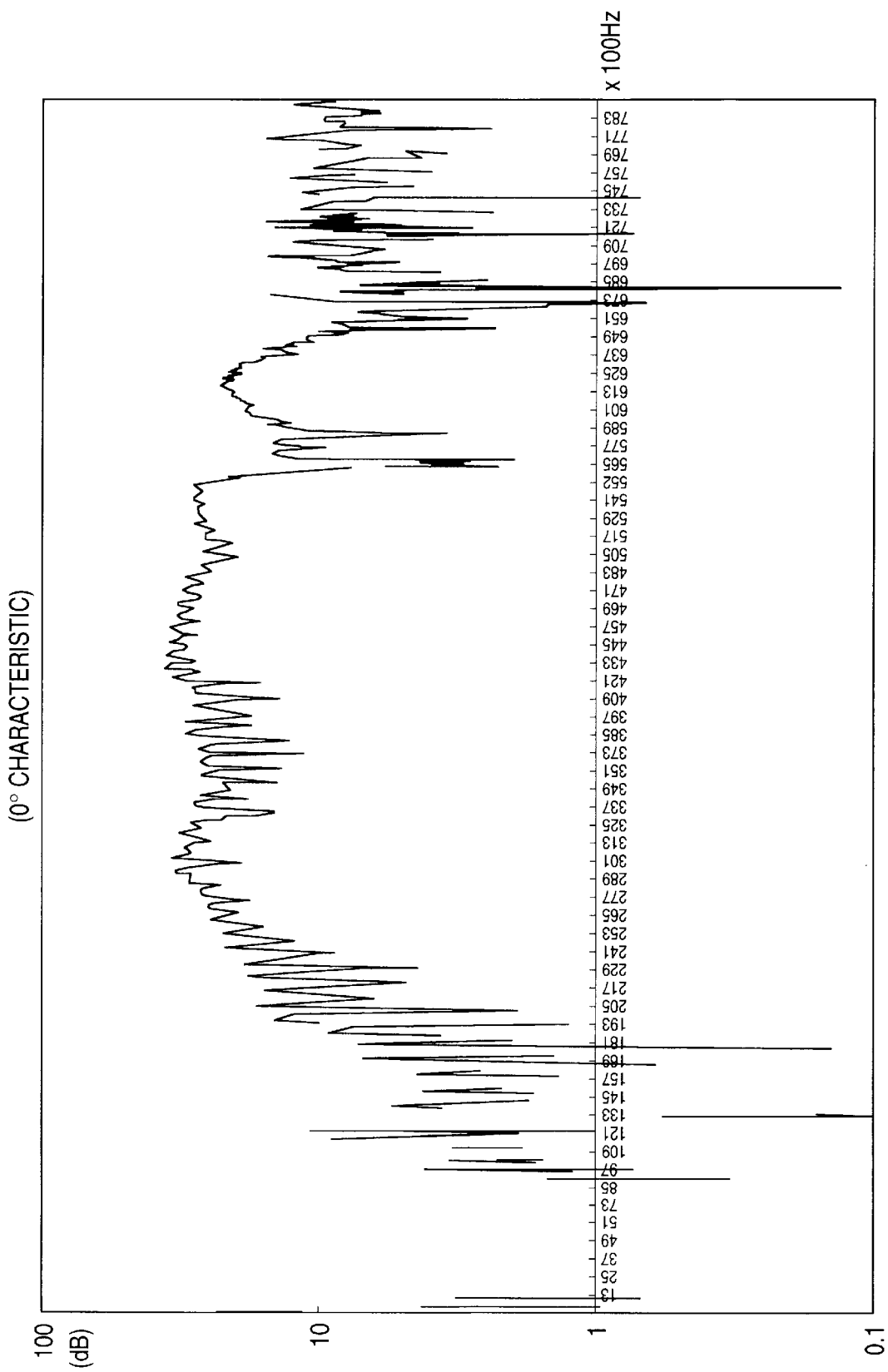
FIG. 19 is a view showing a 0° characteristic of the ultrasonic wave that is oscillated from the input pen in FIG. 18.
Figure 20:
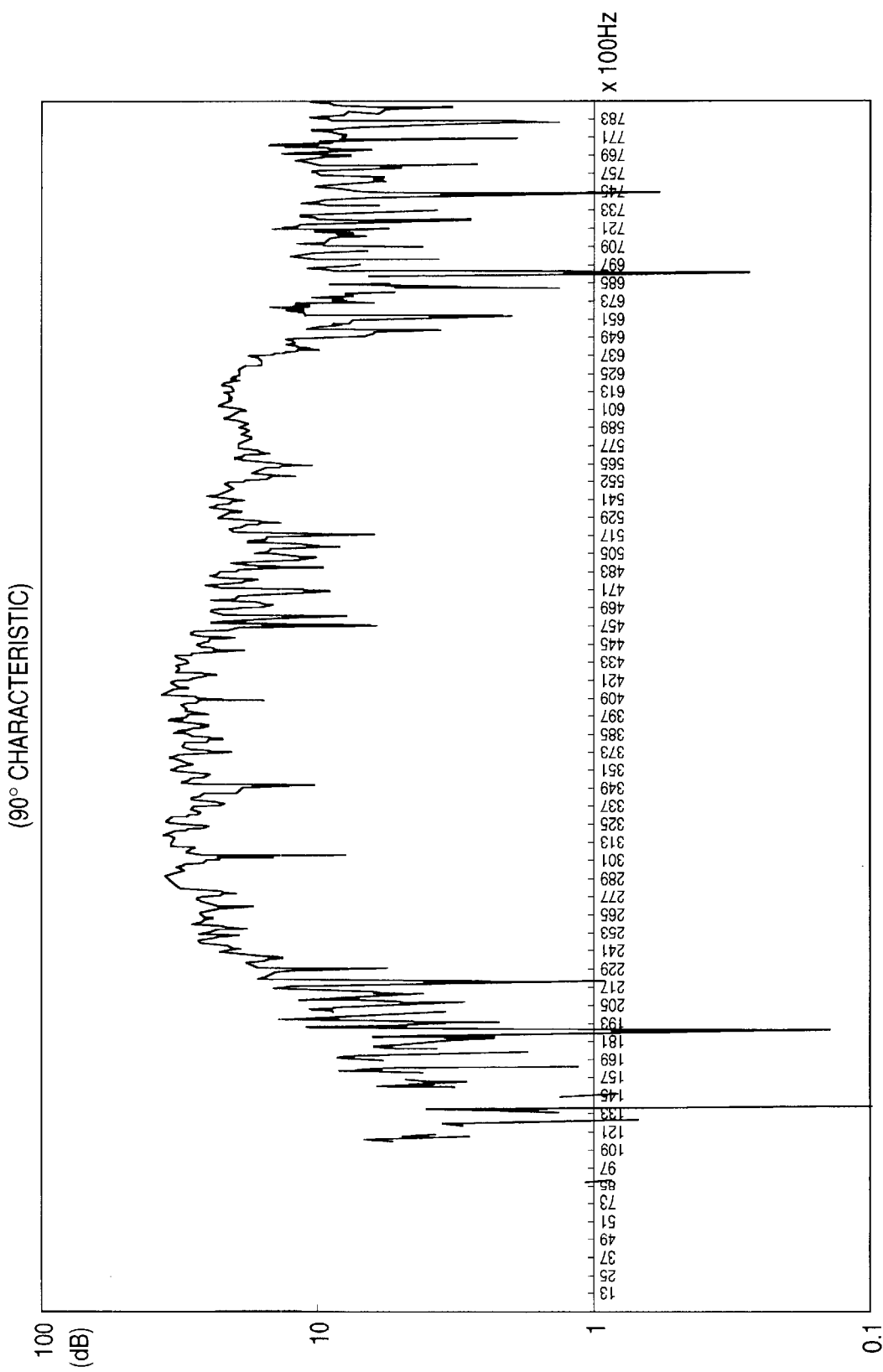
FIG. 20 is a view showing a 90° characteristic of the ultrasonic wave that is oscillated from the input pen in FIG. 18.

FIG. 19 is a graph showing an f-characteristic (0 degree characteristic) of the ultrasonic wave that is oscillated along the axis line direction of the casing 12A' out of the ultrasonic waves oscillated from the opening 12c'' of the input pen 12'. FIG. 20 is a graph showing an f-characteristic (90 degree characteristic) of the ultrasonic wave that is oscillated in the perpendicular direction to the axis line of the casing 12A'.

Figure 21:
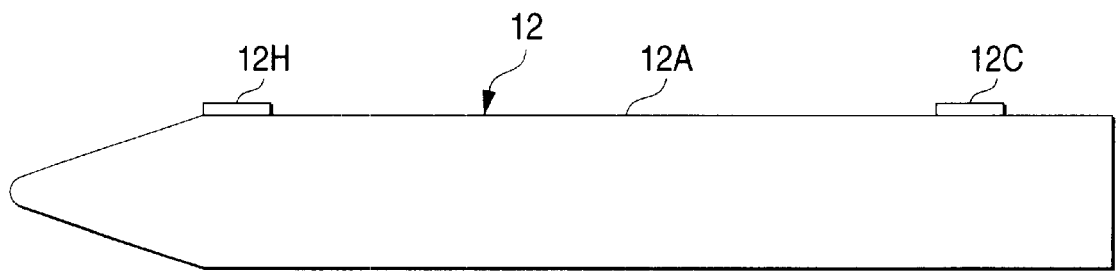
FIG. 21 is a side view showing another configuration of the input pen.

FIG. 21 is a side view showing another configuration of the input pen 12 in FIG. 3.

In this example, the power switch 12C is provided to the outer peripheral surface of the casing 12A as the externally provided type. The internal circuit connection is similar to the example in FIG. 5.

Since the power switch 12C in the input pen 12 of this example is externally provided, this power switch 12C can be used as the main switch. Thus, ON/OFF of the power supply can be executed by operating this power switch 12C by the finger.

Figure 22:
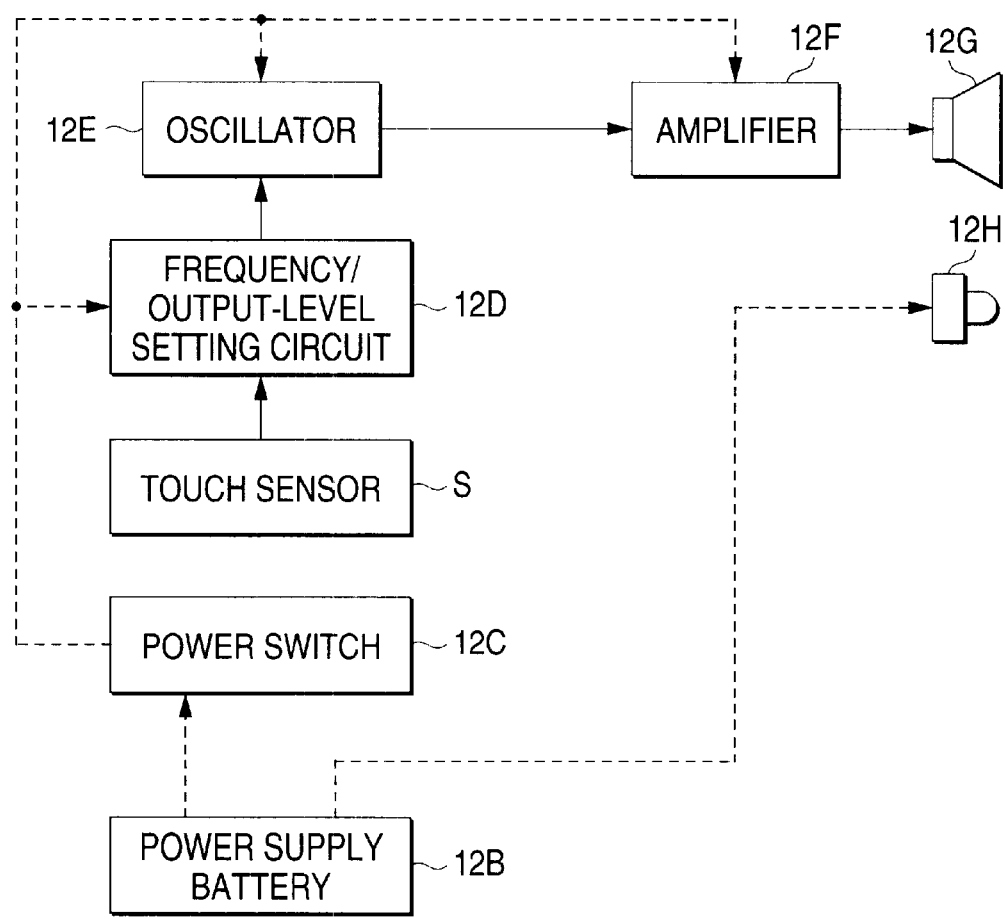
FIG. 22 is a block diagram showing another example of internal circuit connection of the input pen.

FIG. 22 is a block diagram showing still another connection state of the internal circuit of the input pen 12 in FIG. 3.

In this example, like the example in FIG. 21, the power switch 12C is provided to the outer peripheral surface of the casing 12A as the externally provided type. But the touch sensor S is connected only to the frequency/output-level setting circuit 12D, and ON/OFF of the power supply is performed only by the power switch 12C.

In the connection example of the internal circuit shown in FIG. 5 and FIG. 22 described above, the touch sensor S senses the contact pressure or the number of contact times between the pen point of the input pen and the touch panel, and then outputs the sensed signal to the frequency/output-level setting circuit 12D. Then, the frequency/output-level setting circuit 12D changes the set value of the frequency and the output level of the ultrasonic wave generated by the oscillator 12E, in response to the sensed signal from the touch sensor S.

Then, after the frequency or the output level of the ultrasonic wave is set in answer to the contact pressure and the number of contact times between the pen point of the input pen and the touch panel, when the microphones sense the ultrasonic wave having the set frequency or output level, the touch position sensor 13 (see FIG. 1) outputs a command signal to the microcomputer 14 to display the image that is previously set correspondingly.

For example, the correspondence between the frequency of the ultrasonic wave set by the frequency/output-level setting circuit 12D and the image displayed on the touch panel may be set such as 100 kHz—thick line red
90 kHz—thin line red
80 kHz—thick line black
70 kHz—thin line black, or the frequency may be set to display other color line, or the frequency may be set to display the solid line and the dotted line.

For example, line drawings using various colors may be depicted on the screen of PDP by setting attributes between the frequency or the output level of the ultrasonic wave as above and the display image at the touch position by the input pen.

Figure 23:
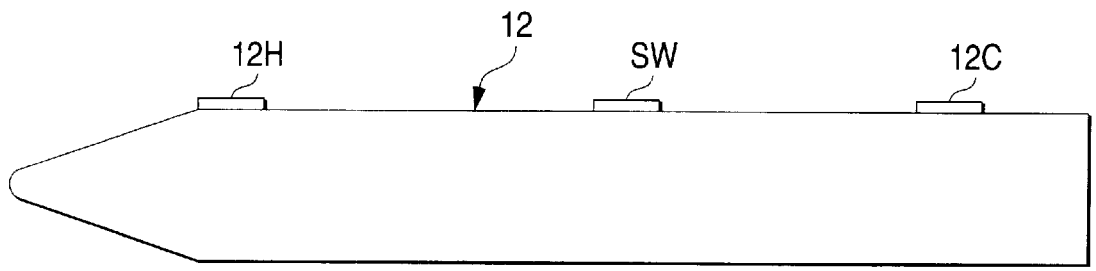
FIG. 23 is a side view showing still another configuration of the input pen.
Figure 24:
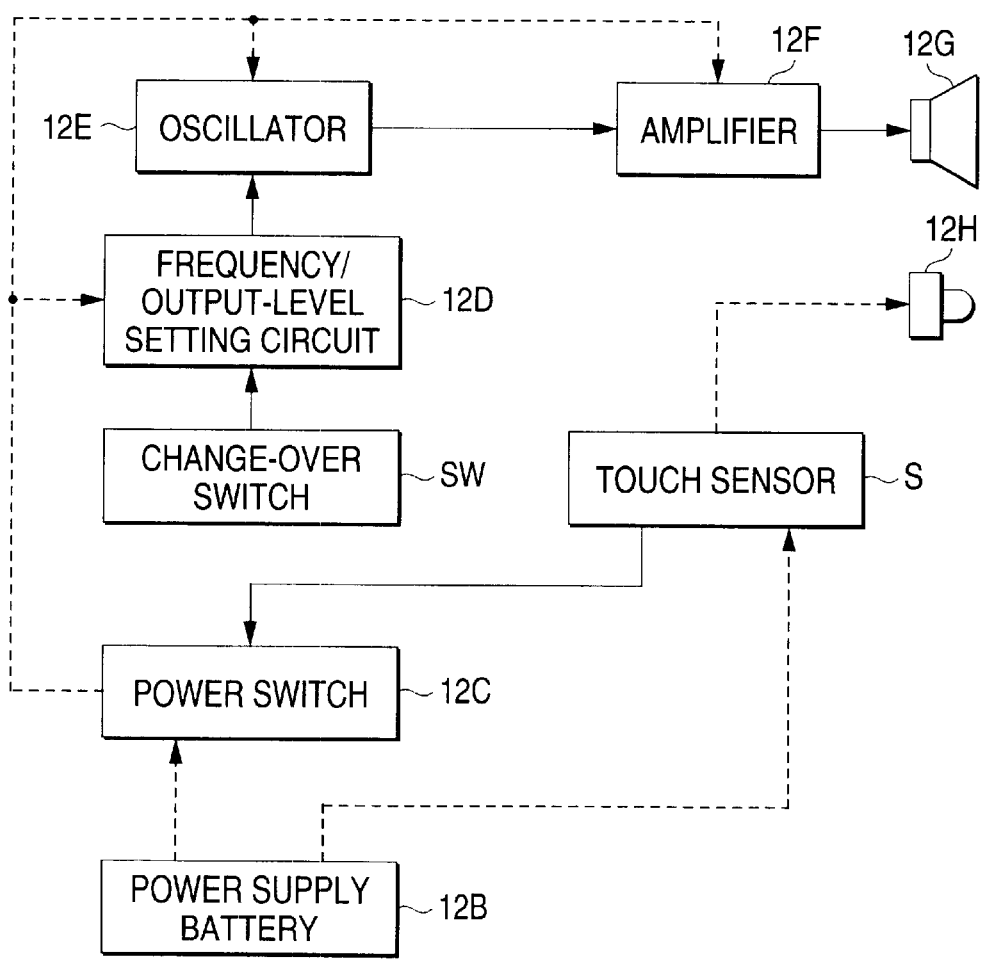
FIG. 24 is a block diagram showing another example of internal circuit connection of the input pen in FIG. 23.
Figure 25:
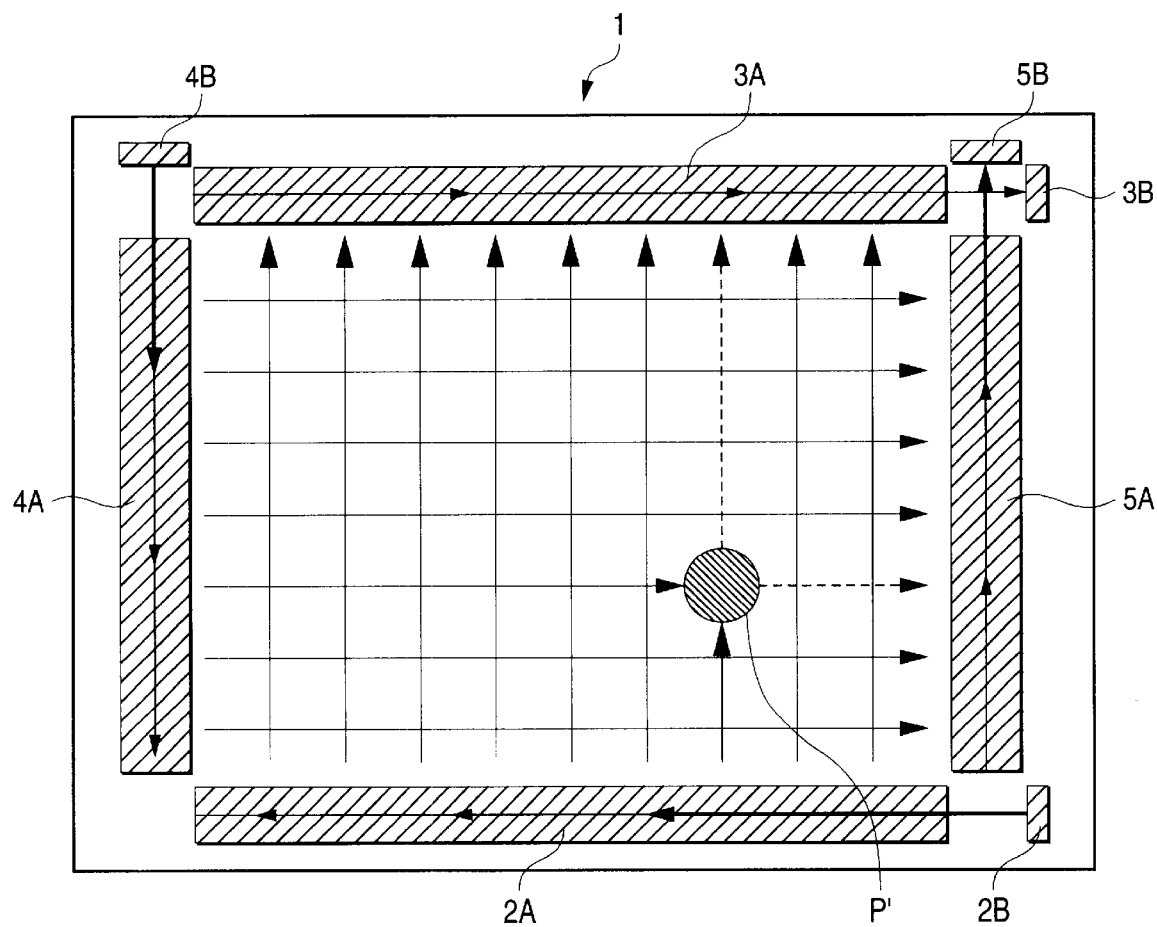
FIG. 25 is a view showing an example in the conventional art.

FIG. 23 is a side view showing an example of the input pen 12 in which a change-over switch SW for setting manually the frequency and the output level in the frequency/output-level setting circuit 12D is provided. FIG. 24 is a block diagram showing a connection state of the internal circuit of the input pen 12.

In this example, the change-over switch SW is provided externally and also the power switch 12C and the LED 12H are externally provided.

In FIG. 24, the change-over switch SW is connected to the frequency/output-level setting circuit 12D such that the set value of the frequency or the output level of the ultrasonic wave in the frequency/output-level setting circuit 12D is switched by switching the change-over switch SW.

Then, the configuration is similar to the connection example in FIG. 5 except that the touch sensor S participates only in ON/OFFs of the power switch 12C and the LED 12H.

In the example in FIG. 23 and FIG. 24, since the set value of the frequency or the output level of the ultrasonic wave can be switched in the frequency/output-level setting circuit 12D by switching the change-over switch SW, like the above case, the desired image can be displayed at the touch position according to the attributes between the previously set frequency or output level of the ultrasonic wave and the display image at the touch position by the input pen.

What is claimed is:

1. A touch panel device for sensing a touch position on a touch panel comprising:

a flat display device;

the touch panel provided in front of the flat display device;

an input pen containing a signal oscillating member, for oscillating a sound signal that is output from the signal oscillating member from a top end portion;

two sound collecting members respectively arranged at least at any two different locations of edge portions of the touch panel, for sensing the sound signal propagated through a space;

a coordinate position calculating member for calculating a coordinate of the touch position of the input pen on the touch panel by calculating distances between the two sound collecting members and the touch position of the input pen on the touch panel, based on the sound signal oscillated from the input pen to be sensed by the sound collecting members; and an oscillating signal absorbing member for absorbing the sound signal oscillated from the signal oscillating member to edge portions of the touch panel, wherein the sound collecting members have a sound collecting directivity characteristic that covers an overall surface of the touch panel in response to fitted positions of the edge portions of the touch panel.

2. The touch panel device according to claim 1, wherein each of the two sound collecting members is a microphone.

3. The touch panel device according to claim 1, wherein the two sound collecting members are arranged at corner positions of the edge portions of the touch panel and have a 90-degree sound collecting directivity characteristic in a flat plane that is parallel to the touch panel.

4. The touch panel device according to claim 1, wherein each of the two sound collecting members have a horn member to form an opening portion that is opened forward by an angle of 90 degree.

5. The touch panel device according to claim 1, wherein the sound collecting members are arranged at middle positions of the edge portions of the touch panel and have a 180-degree sound collecting directivity characteristic in a flat plane that is parallel to the touch panel.

6. The touch panel device according to claim 1, wherein the signal oscillating member is a piezoelectric loudspeaker containing a piezoelectric element.

7. The touch panel device according to claim 1, wherein the input pen has an opening portion formed at a top end portion, and the sound signal that is output by the signal oscillating member being built in the input pen is oscillated from the opening portion to have a directivity of 360 degree around a penholder of the input pen.

8. The touch panel device according to claim 1, wherein an inner wall surface of the pen point portion of the input pen is formed in a circular cone shape such that a diameter is reduced smaller toward a top end side, an inside of the circular cone shape is communicated to an outside via an opening portion that is formed on a top end of the input pen, and the sound signal output from the signal oscillating member via the inside of the circular cone shape formed at the pen point portion of the input pen is oscillated from the opening portion.

9. The touch panel device according to claim 1, wherein a top end of the input pen is formed in a spherical shape, and opening portions that oscillate the sound signal being output from the signal oscillating member to an outside are formed on an outer peripheral surface of the input pen in rear of the top end being formed like the spherical shape.

10. The touch panel device according to claim 1, wherein the input pen has a battery member that supplies a drive power to the signal oscillating member therein, a holder for holding the input pen is prepared, a charging member is built in the holder, and the battery member of the input pen is charged by the charging member when the input pen is held by the holder.

11. The touch panel device according to claim 1, wherein the flat display device consists of a plasma display panel.

* * * * *